Figure 1:
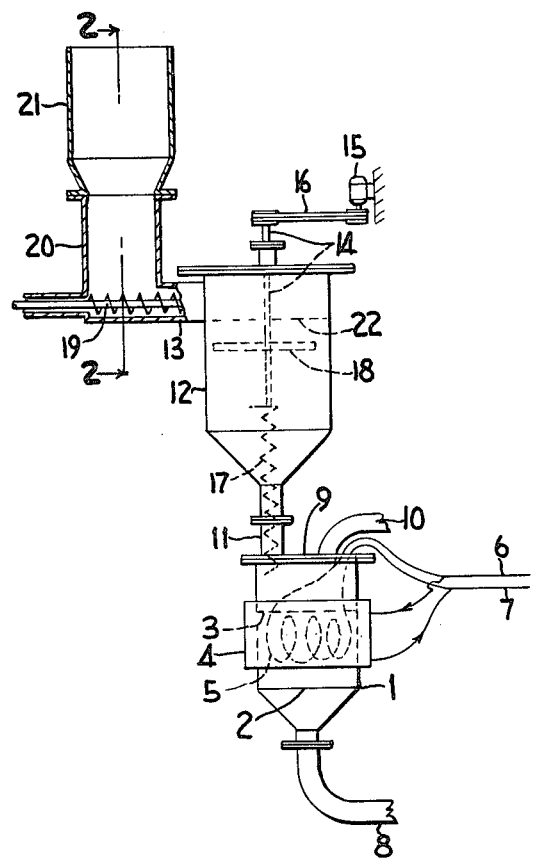
Figure 2:
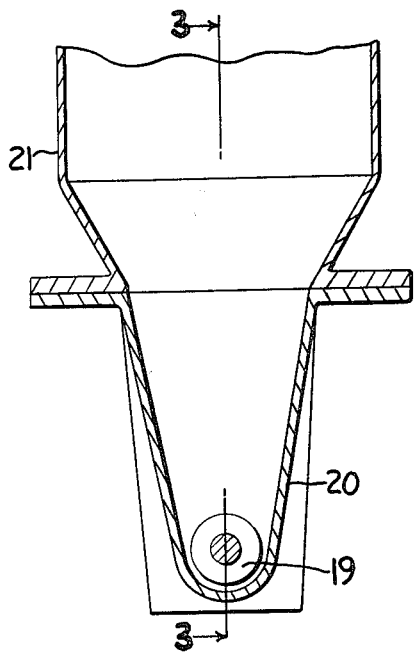
Figure 3:
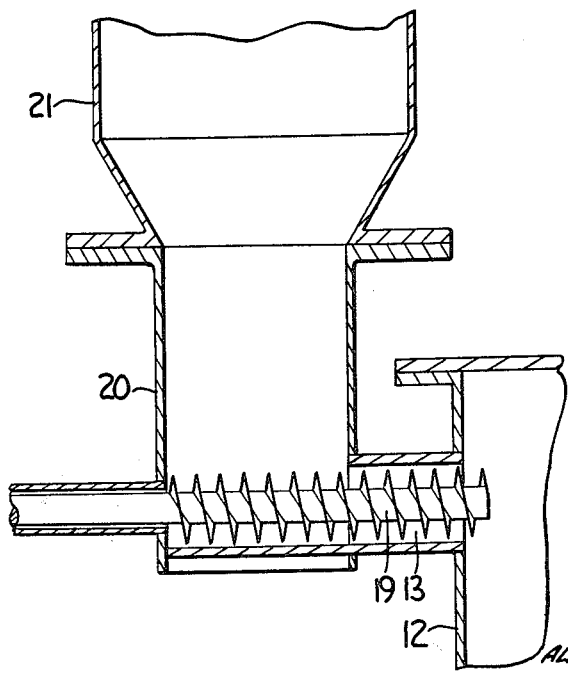

March 23, 1965  A. E. CALLOW ETAL  3,174,873
ENTRAINMENT OF VAPOURS IN GASES

Filed April 25, 1961  2 Sheets-Sheet 2

INVENTORS
ALAN EDWARD CALLOW and
BY JAMES DENNIS GROVES

Oscar L. Spencer
ATTORNEY

3,174,873
ENTRAINMENT OF VAPOURS IN GASES
Alan Edward Callow, Normanby, Middlesbrough, and James Dennis Groves, Fairfield, Stockton-on-Tees, England, assignors to British Titan Products Company Limited, Billingham, England, a corporation of the United Kingdom
Filed Apr. 25, 1961, Ser. No. 105,455
Claims priority, application Great Britain, Apr. 25, 1960, 14,476/60
11 Claims. (Cl. 106—300)

For various industrial purposes it is required to produce a gas stream entraining continuously an accurately proportioned amount of a vapour or one or more normally solid and/or one or more normally liquid substances.

This is required especially in the case where gases entraining vapours are to be introduced into reaction zones for the carrying out of certain chemical reactions. An example of this is the vapour phase oxidation of a titanium halide, e.g., titanium tetrachloride, in which the titanium halide and oxygen or oxidizing gas are continuously introduced, separately or admixed, into a reaction zone, and there has to be entrained in the oxygen or oxidizing gas a metered quantity of the vapour of a halide or of at least one other metal (or metalloid) such as, for example, a halide (e.g., chloride) of aluminium, zirconium, silicon, tin, and/or boron. The purpose of this is that the other halide or halides will also be subjected to oxidation in the reaction zone so that there will be obtained a desired type of metal oxide product. The reaction zone may be just a space in a chamber or it may be a fluidized bed of particulate inert solid material, the reaction gases and vapours being admitted into the reaction zone through burners, jets or other suitable inlet passages.

Practical difficulties, hitherto not satisfactorily resolved, have been encountered in effectively carrying out the step of introducing into a gas at a predetermined rate the desired vapour or vapours, especially when the vaporized substance is or includes a substance which is normally solid. Such difficulties are aggravated when, as is often the case, the gas stream is under super-atmospheric pressure. Thus, when a solid or liquid is vaporized and passed to the oxidation reaction through a pipe, the pipe must be heated to prevent plugging from solidification or liquidation of the metal halide. In any event, such heating is not altogether satisfactory since temperature variations in the pipe tend to result in an inaccurate and incontinuous feed of the metal halide to the reaction.

The present invention overcomes the above difficulties by passing the stream of gas, or a temporarily branched portion of it, through a bed of inert particulate material fluidized by said gas, and introducing in a distributed state into or upon said bed at a predetermined rate the substance or substances to be vaporized and entrained in said gas, the bed being maintained at a temperature high enough to vaporize said substance or substances promptly and uniformly.

Generally it will be undesirable that the substance or substances to be vaporized should be decomposed, or react with the gas, at the temperature at which the bed is maintained, and therefore the substances, the gas and the temperatures involved will be selected to avoid this happening.

The temperature of the bed will normally be below red heat. It may be maintained by preheating the stream of gas, or the branched portion of it, and/or by applying external and/or internal heat to the bed by means, for example of jacketing and/or internal coils through which heated fluid such as steam is circulated. It will be appreciated that many other ways of applying heat to the bed may be adopted.

Solid substances to be vaporized are supplied to the bed in a comminuted state so that they have particle sizes preferably small enough to pass through a mesh at least as fine as 10 B.S.S. The comminuted solid substance may conveniently be fed uniformly to the fluidized bed by means of a screw or worm conveyor. Liquid substances to be vaporized are conveniently fed to the fluidized bed through pipes or nozzles under the control of adjustable valves.

The nature of the gases in which vapours are to be entrained will of course depend on particular requirements. Generally the gases will be inert with respect to said vapours at the temperature of the fluidized bed. Examples of gases are air, oxygen, nitrogen and chlorine. The term "gas" does not exclude vapour and thus the gas may be, for example, the vapour of titanium tetrachloride.

The inert material constituting the fluidized bed may consist of silica, alumina, titania, zirconia, or various mineral substances such as rutile, bauxite, hematite, magnetite and zircon. The physical state of the solid material of the bed will normally be as discrete particles which are sand-like, the preferred particle size being between 200 and 20 B.S.S. mesh, preferably an average size of 100 to 300 microns.

A particular example of a solid substance required to be vaporized and entrained in a gas is aluminium chloride. The entrainment of aluminium chloride in a stream of oxygen used for oxidizing titanium tetrachloride in a vapour phase reaction is useful for the purpose of imparting modified properties to a titanium dioxide pigment produced by such reaction. There may accompany the aluminium chloride vapour in the oxygen stream another normally solid chloride such as zirconium chloride which will likewise be evaporated in the fluidized bed. In addition, normally liquid substances may be vaporized and entrained in the oxygen stream, e.g., silicon tetrachloride. Further, the titanium tetrachloride which is used as the main reactant can be vaporized in the fluidized bed so as to be entrained in the stream of oxygen or other oxidizing gas.

In certain cases a normally solid substance or substances may be fed into the fluidized bed evaporator already associated with a normally liquid substance to be vaporized, so that the feed is a slurry or, when possible, a solution of the normally solid substance in the normally liquid substance.

In the operation of the above process the temperature within the bed should be insufficient to cause reaction of the metal halide with the gas. Thus, if the metal halide is aluminium chloride and the gas is oxygen, the temperature of the vaporization zone should be below the oxidation temperature of aluminium chloride. A desirable temperature range is 50° C. to 450° C., preferably 100° C. to 250° C. Of course, when the gas is inert, for example, chlorine, any temperature may be employed which is above the vaporization temperature of the metal halide to 1400° C.

The drawing accompanying the provisional specification shows in elevation one form of apparatus which may be used in carrying out a process according to the invention.

In the drawing there is shown a vessel 1 containing a bed of inert particulate material to be fluidized. The bed is supported on a perforated plate 2, the upper level of the bed being indicated by the line 3.

The vessel 1 is provided with a steam jacket 4 and an internal steam coil 5, both supplied through pipes indicated at 6 and 7.

Leading into the bottom of the vessel 1 below the perforated plate 2 is a gas duct 8 for admitting gas to fluidize the bed in the vessel 1 and to entrain subsequently the vapour of a substance to be evaporated in said vessel.

The vessel 1 has a top cover 9 provided with a gas discharge duct 10 and a solids inlet duct 11. The solids inlet duct 11 is in communication with a feeder vessel 12 which has a cover top provided with a solids feed duct 13 and a bearing for a shaft 14 which is rotated by a motor 15 and a belt and pulley transmission indicated at 16. The lower end of the shaft 14 carries a worm conveyor element 17 which extends through the solids inlet duct 11. The shaft 14 also carries an agitator indicated at 20. The solids feed duct 13 leads from a hopper 18 with an interposed valve 19.

In operation a gas, which may be preheated to a temperature of say 100 to 150° C., is supplied through the duct 8 and passes through the perforated plate 2 into the bed of particulate material supported hereby so as to fluidize the bed. The fluidization enhances transfer of heat to the bed material from the steam jacket 4 and steam coil 5, and ensures that solid material fed on to the bed will be intimately dispersed in the bed so as to be promptly vaporized.

The solid material to be vaporized is contained in the hopper 21 and is periodically delivered, by opening the valve 19, through the duct 13 into the vessel 12. The vessel 12 is maintained charged with comminuted solids substance to an average level indicated by the line 22. The motor 15 being in operation, the shaft 14 is rotated so that the agitator 20 keeps the charge of solid material in the vessel 12 in motion and so that the solid material is delivered at a controlled rate into the evaporator vessel 1 by means of the worm conveyor 17.

The following are examples of using the apparatus for supplying oxygen entraining aluminium chloride vapour to a furnace (not shown) in which titanium tetrachloride is oxidized in the vapour phase according to any customary process.

*Example 1*

The vessel 1 has an internal diameter of 9 inches and is charged to a height of 4 inches with silica sand having a particle size of 30–44 B.S.S. mesh. The sand is heated to a temperature of 155° C. by means of the steam jacket 4 and the steam coil 5, with are supplied with steam at 120 pounds per square inch.

Oxygen at a temperature of 100° C. is passed into the vessel 1 through the duct 8 and perforated plate 2. Anhydrous aluminium chloride is supplied from the hopper 18 in batches of 100 pounds into the vessel 12 and this is fed into the vessel 1 by the worm conveyor 17 rotated at 18 r.p.m. whereby a steady and uniform flow of aluminium chloride is passed to the fluidized bed. On the introduction of the aluminium chloride the temperature of the fluidized bed drops to 150–120° C. due to the evaporation of the aluminium chloride. The evaporated aluminium chloride is entrained in the oxygen stream at a uniform rate of 20 pounds an hour and the stream containing the vapour is discharged from the vessel 1 through the duct 10 to proceed to a furnace (not shown) in which there is carried out the vapor phase oxidation of titanium tetrachloride.

It will be understood that it is not necessary that all the oxygen to be taken to the furnace for oxidizing titanium tetrachloride need be passed through the evaporating apparatus. A part of the required oxygen may be delivered direct to the furnace and the other part by-passed to go through the evaporator and thereafter rejoin the first-mentioned part of the oxygen stream. The proportion of oxygen which is by-passed can be controlled by suitable valves in the gas ducts 8 and 10 and in the main oxygen supply pipe (not shown).

*Example 2*

The apparatus is similar to that described in the previous example.

Jacket 4 and coil 5 are supplied with vapour from a vessel containing a boiling mixture of 73.5% diphenyl oxide and 26.5% diphenyl, the mixture being boiled by means of an external electric heater. The pressure inside the boiler is approximately 20 lbs./sq. inch.

Vessel 1 which is lagged with three layers of 1" diameter asbestos rope, is charged to a depth of about 6" with titania sand of particle size 60–100 B.S.S. mesh. Oxygen is then passed into vessel 1 through duct 8 and perforated plate 2, at a rate of 37.5 s.c.f.m. to fluidize the bed. The oxygen is preheated to a temperature of 110° C.

Under the above conditions the titania sand is maintained at a temperature of 260° C.

Anhydrous zirconium tetrachloride in powdered form is fed to vessel 1 from vessel 12, by means of worm conveyor 17, which is rotated at about 12 r.p.m. A steady flow of about 12.5 lbs. per hour of zirconium tetrachloride is delivered to the fluidized bed in vessel 1 by this means. Vessel 12 is replenished from hopper 21 by means of screw conveyor 19.

As zirconium tetrachloride is introduced into the fluid bed the temperature of the latter drops by about 20° C. From duct 10 there issues a stream of oxygen gas mixed with zirconium tetrachloride vapour in the volume ratio $O_2:ZrCl_4:110:1$. The temperature of the mixture, measured at a point just inside the duct 10, is approximately 240° C. The duct is provided with a flexible electric heater over the whole of its length to ensure that the gas mixture passing through is maintained at a temperature in excess of 230° C.

The zirconium tetrachloride in vessel 1 is readily vaporized and entrained in the oxygen stream by the method described.

The duct carrying the oxygen/zirconium tetrachloride mixture is connected to a furnace wherein titanium tetrachloride is oxidized in the vapour phase to titanium dioxide. Gaseous chlorine may be substituted for the oxygen gas of the above example with similar desirable results.

The above process has the advantage over previous processes in that there results substantially accurate control over the temperature of the evolved vaporous metal halide. This is important when the metal halide is utilized in the vaporous metal halide. This is important when the metal halide is utilized in the vapour phase oxidation of titanium tetrachloride. When vaporous metal halide introduced to the oxidation reaction varies in temperature, it will have an effect on the overall reaction temperature and may or may not be reflected in the $TiO_2$ produced. If the metal halide, e.g., aluminium chloride, is employed for nucleating the production of $TiO_2$, variations in the temperature would have the effect of varying the particle size uniformity of the nuclei. To compensate for this change in seed size, variations in velocity and temperature of reaction must accordingly be effected. Since most $TiCl_4$ oxidation reactions operate under complex mixing conditions, experimentation is necessary in each case. This cannot effectively be done in a commercial operation.

Although the present invention has been described in detail as to particular embodiments thereof, it is not intended that these details shall limit the scope of the invention except insofar as included in the accompanying claims.

We claim:

1. The process of vaporizing a metal halide selected from the group consisting of the halides of aluminium, zirconium, silicon, tin and boron which comprises introducing said halide to a fluid bed of inert particles maintained at a temperature sufficient to vaporize said halide, said bed being maintained by a fluidizing gas which does not react with the halide at said vaporization temperature, said metal halide being introduced to said fluid bed at a rate such that a predetermined proportion of said vaporous metal halide to said fluidizing gas is maintained in said fluidizing gas and withdrawing said vaporous metal halide from the bed in admixture with said fluidizing gas.

2. The process of claim 1 wherein the metal halide prior to vaporization is solid.

3. The process of claim 2 wherein the metal halide is aluminium chloride and the gas is oxygen.

4. The process of claim 2 wherein the metal halide is zirconium halide and the gas is oxygen.

5. The process of claim 1 wherein the metal halide is silicon tetrachloride and the gas is oxygen.

6. The process of claim 1 wherein the gas is a mixture of oxygen and $TiCl_4$.

7. The process of vaporizing solid aluminium chloride which comprises introducing said chloride to a fluid bed of inert particles maintained at 100° C. to 250° C. said bed being maintained by fluidizing oxygen, said solid aluminium chloride being introduced to said fluid bed at a rate such that a predetermined proportion of said vaporized aluminium chloride to said fluidizing oxygen is maintained in said fluidizing oxygen and withdrawing said vaporized aluminium chloride from the bed in admixture with oxygen.

8. In the process of oxidizing titanium tetrachloride by the reaction of titanium tetrachloride with oxygen at a temperature of 750° C. to 1400° C., the improvement which comprises vaporizing solid aluminium halide in an inert fluidized bed maintained at a temperature of 100° C. to 250° C., said bed being fluidized by oxygen, said solid aluminium halide being introduced to said fluidized bed at a rate such that a predetermined proportion of said vaporized aluminium halide to said oxygen is maintained in said oxygen, withdrawing said vaporized aluminium chloride in admixture with said oxygen, and introducing said mixture to the oxidation reaction.

9. The process of vaporizing aluminium chloride which comprises introducing said chloride to a fluid bed of inert particles maintained at a temperature of 100° C. to 1400° C., said bed being maintained by gaseous chlorine, said aluminium chloride being introduced to said fluid bed at a rate such that a predetermined proportion of said vaporized aluminium chloride to said gaseous chlorine is maintained in said gaseous chlorine, and withdrawing said vaporized aluminium chloride from the bed in admixture with evolved gaseous chlorine.

10. In the process of oxidizing titanium tetrachloride by the reaction of titanium tetrachloride with oxygen at a temperature of 750° C. to 1400° C., the improvement which comprises vaporizing solid aluminium halide in an inert fluidized bed maintained at a temperature of 100° C. to 1400° C., said bed being fluidized by chlorine, said solid aluminium halide being introduced to said fluidized bed at a rate such that a predetermined proportion of said vaporized aluminium halide to said chlorine is maintained in said chlorine withdrawing said vaporized aluminium halide in admixture with said chlorine, and introducing said mixture to the oxidation reaction.

11. In a process of oxidizing titanium tetrahalide with an oxidizing gas within a reactor at a temperature of 750–1400° C., the improvement which comprises vaporizing at least one metal halide selected from the group consisting of the halides of aluminium, zirconium, silicon, tin, and boron within a fluid bed of inert particles maintained at a temperature sufficient to vaporize said halide, said bed being fluidized by a gas which does not react with the halide at said vaporization temperature, said metal halide being introduced to said fluidized bed at a rate such that a predetermined proportion of said vaporized metal halide to said fluidizing gas is maintained in said fluidizing gas, withdrawing said vaporized metal halide in admixture with said fluidizing gas, and introducing said mixture into the reactor.

References Cited in the file of this patent
UNITED STATES PATENTS

| | | |
|---|---|---|
| 2,559,638 | Krchma et al. | July 10, 1951 |
| 2,790,704 | Lewis | Apr. 30, 1957 |

FOREIGN PATENTS

| | | |
|---|---|---|
| 686,570 | Great Britain | Jan. 28, 1953 |